J. W. ESTERLINE.
DEAD BEAT RECORDING INSTRUMENT.
APPLICATION FILED JAN. 31, 1916.

1,208,304.

Patented Dec. 12, 1916.
2 SHEETS—SHEET 1.

WITNESSES:
Frank A. Fahle
Josephine Gasper

INVENTOR
John W. Esterline,
BY
Hood & Schley.
ATTORNEY

J. W. ESTERLINE.
DEAD BEAT RECORDING INSTRUMENT.
APPLICATION FILED JAN. 31, 1916.

1,208,304.

Patented Dec. 12, 1916.
2 SHEETS—SHEET 2.

WITNESSES:

INVENTOR
John W. Esterline,

BY
ATTORNEYS

UNITED STATES PATENT OFFICE.

JOHN W. ESTERLINE, OF INDIANAPOLIS, INDIANA.

DEAD-BEAT RECORDING INSTRUMENT.

1,208,304. Specification of Letters Patent. Patented Dec. 12, 1916.

Application filed January 31, 1916. Serial No. 75,197.

*To all whom it may concern:*

Be it known that I, JOHN W. ESTERLINE, a citizen of the United States, residing at Indianapolis, in the county of Marion and State of Indiana, have invented a new and useful Dead-Beat Recording Instrument, of which the following is a specification.

My invention relates to recording instruments in which a pen is movable to different positions in accordance with the condition to be measured, and makes a mark on a moving record sheet.

It is the object of my invention to make such a recording instrument dead beat, so that the pen will accurately follow the changes in condition without "overshooting" with its consequent vibration, and the record produced will be clear and accurate.

In carrying out my invention, I supply the pen with ink through a feed tube which dips into an ink well and moves therein as the pen moves upon changes in the condition to be measured, and provide on the end of the feed tube where it dips into the ink well a paddle which moves therewith and by the resistance to its movement offered by the ink in the ink well damps out the vibrations of the pen and makes the instrument dead beat.

The accompanying drawings illustrate my invention.

Figure 1:
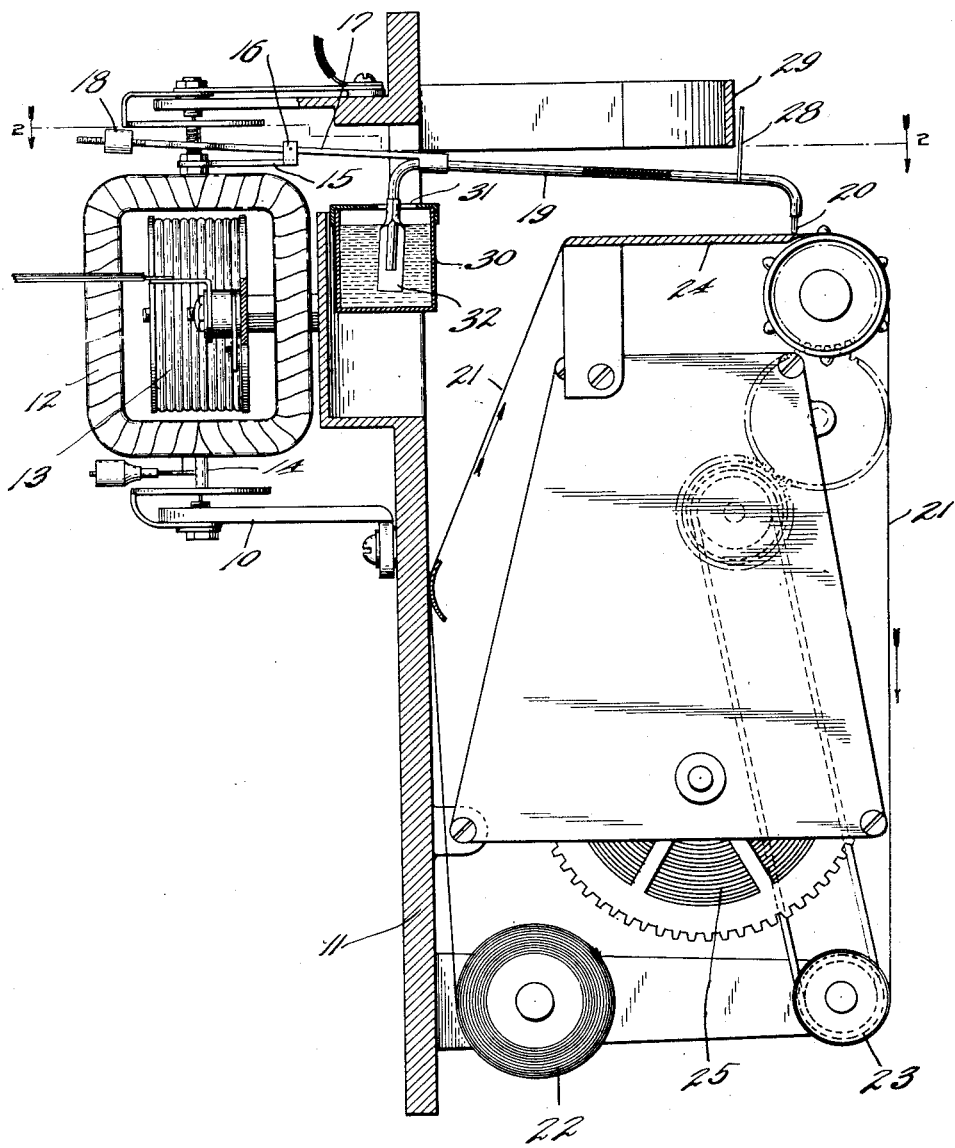
Figure 2:
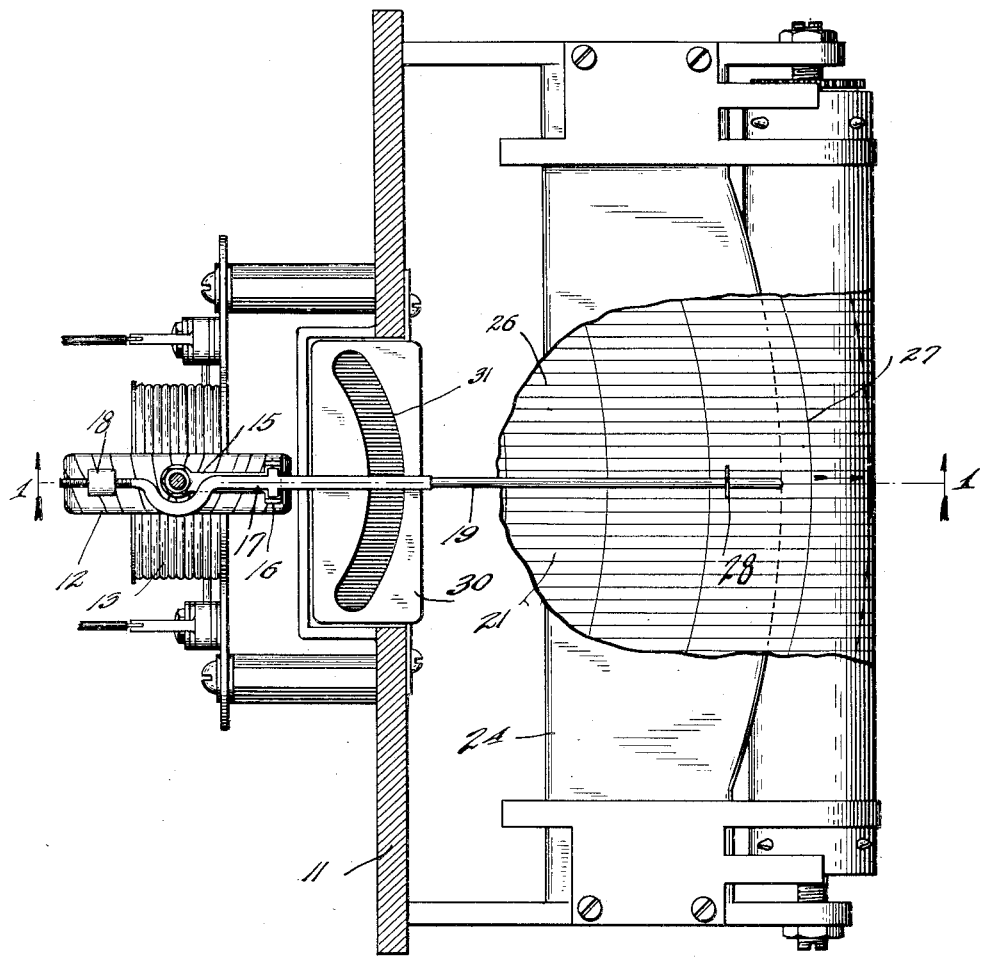
Figure 3:

Figure 1 is a central vertical section through a recording meter embodying my invention, the meter shown being a watt meter, the section being taken substantially on the line 1—1 of Fig. 2; Fig. 2 is a section on the line 2—2 of Fig. 1, showing the recording parts in plan, with part of the record sheet broken away; and Fig. 3 is an enlarged detail, showing the paddle on the end of the feed tube where it dips into the ink well.

Pivotally mounted on rearwardly extending arms 10 from the main frame 11 to swing about a vertical axis is the moving element 12 of the instrument, this moving element being here shown as a voltage coil which surrounds vertically a fixed current coil 13 likewise supported on the main frame 11. Fixed on the vertical shaft 14 of this moving element, near its upper end, is a horizontally extending arm 15, on the projecting end of which is pivoted on a horizontal axis 16 a pen-carrying arm 17, the rear end of which is provided with an adjustable counter-weight 18. On the forward end of the pen-carrying arm 17 is fixed a forwardly projecting feed tube 19, which at its forward end is provided with a marking pen 20 which coöperates with a suitable record sheet 21 movable from the supply roll 22 to the winding roll 23 over a marking plate 24 by suitable clockwork mechanism 25. The record sheet 21 is provided with suitable longitudinally extending markings 26 which indicates suitable units of measurement of the condition to be measured as determined by the movement of the movable element 12 and pen 20 around the axis of the shaft 14, these units being watts or some fraction or multiple thereof with the instrument shown, and with suitable transversely extending markings 27 which indicate suitable divisions of time as determined by the rate at which the clockwork mechanism 25 feeds the record sheet 21, these markings 27 when directly beneath the pen 20 being concentric with the axis of movement of the movable element 12 and pen 20. The feed tube 19 near its forward end may be provided with an upwardly projecting pointer 28 which moves in front of a suitable scale 29 supported from the frame, 11, so as to give visual indication of the momentary value of the condition to be measured at the time of observation.

The rear end of the feed tube 19 extends downward into the ink in an ink well 30, so as to dip into such ink well for all positions of the movable element 12 and pen 20. In the present embodiment of my invention, the ink well 30 is located forward of the shaft 14 so that the rear end of the feed tube 19 extends downward into the ink well 30 through an arc-shaped slot 31 concentric with the shaft 14. In the present instance, the ink is supplied from the ink well 30 through the feed tube 19 to the pen 20 by capillary action, and the weight of the ink in the tube is sufficient to cause the pen 20 to tilt downward against the record sheet 21 with sufficient force to make a continuous mark thereon. The continuity of this marking is not essential, however, as the pen may be arranged to make any desired character of marking, whether continuous or intermittent, and therefore may or may not remain continuously in contact with the record sheet 21. On that end of the feed tube 19 which dips into the ink well 30 is a paddle 32, so that such paddle 32 likewise is in the ink in the ink well. This paddle is here shown as a separate piece clamped on the tube, which is the construction I now prefer. The broad sides of this paddle are transverse to the direction of movement of the paddle in the ink well, so as to offer resistance to such movement, the amount of such resistance being variable by varying the width of the paddle. As a result, upon a change in the condition to be measured, this resistance opposes the movement caused by such change of condition, and makes such movement a relatively slow one, which ceases when the movable element 12 has reached its new position. In other words, the paddle 32 prevents "overshooting" of the movable element 12 by damping out its undue vibrations, and causes it to follow accurately the changes in the condition to be measured, thereby making the instrument dead beat.

I claim as my invention:

1. In a recording instrument, the combination of a pen mounted for movement relative to a record sheet, said pen being pivotally mounted so as to be also movable toward and from the record sheet, an ink well, a feed tube supplying said pen and extending into said ink well and movable therein as the pen is moved, said feed tube where it extends into said ink well being provided with a paddle which moves with it and by the resistance offered by the ink in the ink well serves to damp the vibrations of the pen.

2. In a recording instrument, the combination of a pen mounted for movement relative to a record sheet, an ink well, a feed tube supplying said pen and extending into said ink well and movable therein as the pen is moved, said feed tube where it extends into said ink well being provided with a paddle which moves with it and by the resistance offered by the ink in the ink well serves to damp the vibrations of the pen.

3. In a recording instrument, the combination of a pen mounted for movement relative to a record sheet, said pen being pivotally mounted so as to be also movable toward and from the record sheet, an ink well, a feed tube supplying said pen and extending into said ink well and movable therein as the pen is moved, said feed tube where it extends into said ink well being provided with a paddle which moves with it and by the resistance offered by the ink in the ink well serves to damp the vibrations of the pen, said pen being so balanced at its pivotal support for movement toward and from the record sheet that the weight of the ink in the feed tube serves to hold the pen against the record sheet.

4. In a recording instrument, the combination of a pivotally mounted movable element, a pen carried by said movable element for movement thereby relative to a record sheet, an ink well, a feed tube carried by said movable element for movement therewith and extending into said ink well and supplying said pen, said feed tube being provided where it extends into the ink well with a paddle which is resisted in its movements by the ink so as to serve to dampen the movements of said movable element.

5. In a recording instrument, the combination of a pivotally mounted movable element, a pen carried by said movable element for movement thereby relative to a record sheet, said pen being pivotally mounted on said movable element on an axis transverse to the axis of the latter so as to be movable toward and from said record sheet, an ink well, a feed tube carried by said movable element for movement thereby and extending into said ink well and supplying said pen, said feed tube being provided where it extends into the ink well with a paddle which is resisted in its movements by the ink so as to serve to dampen the movements of said movable element.

6. In a recording instrument, the combination of a pivotally mounted movable element, a pen carried by said movable element for movement thereby relative to a record sheet, said pen being pivotally mounted on said movable element on an axis transverse to the axis of the latter so as to be movable toward and from said record sheet, an ink well, a feed tube carried by said movable element for movement therewith and extending into said ink well and supplying said pen, said feed tube being provided where it extends into the ink well with a paddle which is resisted in its movements by the ink so as to serve to dampen the movements of said movable element, said pen being so balanced on the pivotal support on which it is mounted on said movable member that the weight of the ink in said feed tube is sufficient to force it against the record sheet.

7. In a recording instrument, the combination of a pivotally mounted movable element, a pen carried by said movable element for movement thereby relative to a record sheet, an ink well, a feed tube carried by said movable element for movement therewith and extending into said ink well and supplying said pen by capillary action, said feed tube being provided where it extends into the ink well with a paddle which is resisted in its movements by the ink so as to serve to dampen the movements of said movable element.

8. In a recording instrument, the combination of a pivotally mounted movable element, a pen carried by said movable element for movement thereby relative to a record sheet, an ink well, a feed tube carried by said movable element for movement therewith and extending into said ink well and supplying said pen, said feed tube extending into said ink well out of line with the axis of said movable element so as to move in an arc therein and being provided where it extends into the ink well with a paddle which is resisted in its movements by the ink so as to serve to dampen the movements of said movable element.

9. In a recording instrument, the combination of a pivotally mounted movable element, a pen carried by said movable element for movement thereby relative to a record sheet, said pen being pivotally mounted on said movable element on an axis transverse to the axis of the latter so as to be movable toward and from said record sheet, an ink well, a feed tube carried by said movable element for movement therewith and extending into said ink well and supplying said pen, said feed tube extending into said ink well out of line with the axis of said movable element so as to move in an arc therein and being provided where it extends into the ink well with a paddle which is resisted in its movements by the ink so as to serve to dampen the movements of said movable element.

In witness whereof, I have hereunto set my hand at Indianapolis, Indiana, this 24th day of January, A. D. one thousand nine hundred and sixteen.

JOHN W. ESTERLINE.